March 12, 1940.   D. KLEIST ET AL   2,192,917
APPARATUS FOR CLEARING MATTED MATERIAL FROM A SUPPORTING SCREEN
Original Filed Oct. 1, 1935
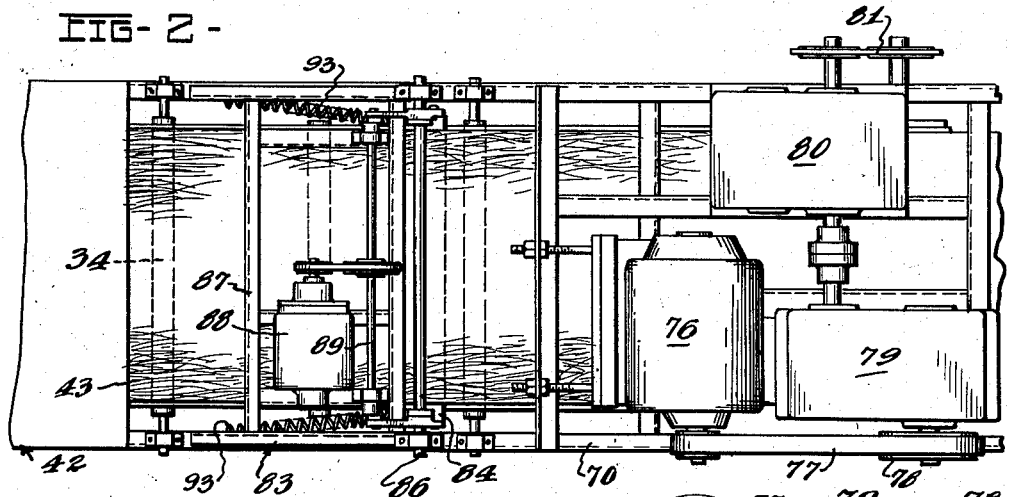
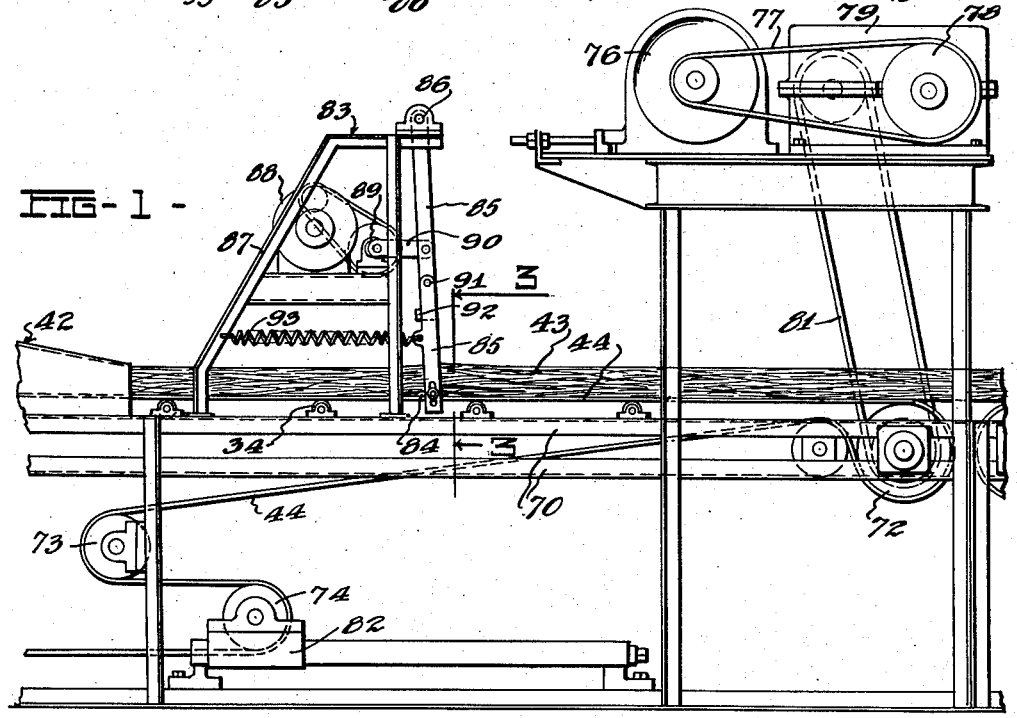
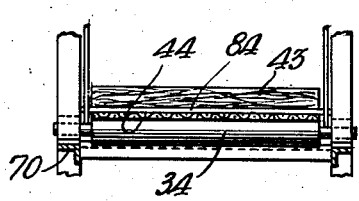
Dale Kleist
Games Slayter INVENTORS
BY
J. F. Rule, ATTORNEY.

Patented Mar. 12, 1940

2,192,917

UNITED STATES PATENT OFFICE 2,192,917

APPARATUS FOR CLEARING MATTED MATERIAL FROM A SUPPORTING SCREEN

Dale Kleist and Games Slayter, Newark, Ohio, assignors, by mesne assignments, to Owens-Corning Fiberglas Corporation, a corporation of Delaware Application October 1, 1935, Serial No. 43,072
Renewed June 21, 1939

4 Claims. (Cl. 19—156)

Our invention relates to apparatus particularly designed for clearing matted fibrous material such as mats, webs or the like, from a foraminous surface such as a screen or open-work conveyor on which the material is supported. The invention may find application in connection with methods and apparatus used in the manufacture of inorganic fibrous material in matted form. As an example, mats of fine glass fibers are made by flowing small streams of molten glass and subjecting them to a blast of steam or the like by which the streams are attenuated to the form of fine fibers which, as they are formed, immediately solidify and are accumulated in matted form upon a screen conveyor. In this manner a mat or web of the glass fibers is continuously formed and advanced with the conveyor beyond the forming zone.

Heretofore, considerable difficulty has been experienced in the use of apparatus of the type above indicated in which fibrous material is deposited upon an openwork or screen conveyor, and particularly where the fibers are forcibly deposited by a blast of gas, on account of the tendency of the fibers to enter the screen and become entangled therewith, thereby causing the mat to adhere to the screen. This prevents the ready removal of the finished mat or bats from the screen, tends to disintegrate the mat and causes a gradual accumulation of fibrous material adhering to the screen so that the latter must be frequently cleared of such accumulations. This seriously interferes with normal operation. An object of our invention is to provide a novel and practical means for overcoming this objection. Such means in its preferred form comprises a knife blade or scraper overlying the screen and reciprocating in contact therewith.

Other objects of the invention will appear hereinafter.

In the accompanying drawing which illustrates one form of our invention:

Fig. 1 is a side elevation of the apparatus;
Fig. 2 is a plan view of the same; and
Fig. 3 is a fragmentary sectional view at the plane of the line 3—3 on Fig. 1.

Referring to the drawing, a web or mat 43 consisting of fine glass fibers or other matted fibrous material, is carried upon a support 44 which may be made in the form of a screen conveyor. The mat may be formed by the method above indicated. In accordance with such method the fine glass fibers as they are formed are forcibly projected onto the conveyor 44 as it travels beneath the hood 42 and are continuously built into a mat which is advanced with the continuously traveling conveyor 44. The conveyor is supported at intervals on rollers 34 on a framework 70. The conveyor is trained over a series of rolls including rolls 72, 73, 74 and other rolls (not shown). The conveyor is driven continuously as by means of an electric motor 76. Power is transmitted from the motor through belt 77, pulley 78, speed reduction gearing contained within gear boxes 79 and 80, and a belt 81 connected to drive the roll 72. The roll 74 is carried on a takeup device 82 of conventional construction for taking up slack in the conveyor 44.

Clearing mechanism 83 for automatically severing or freeing the mat from its entanglement with the wire mesh conveyor comprises a knife blade or scraper 84 which overlies the conveyor 44 and extends transversely thereacross. The blade is mounted in the lower ends of a pair of vertically disposed arms 85, the upper ends of which are pivotally connected to a rod 86 mounted in a framework 87. An electric motor 88 mounted on the frame 87, drives a shaft 89, the ends of which are provided with cranks or eccentrics connected through links 90 to the arms 85.

Each of the arms 85 comprises upper and lower sections connected by a pivot 91, the upper section being provided with a stop lug 92 which is engaged by the lower section. Coil springs 93 hold the lower sections of the arms with a yielding pressure against the stop lugs 92. This construction provides a flexible drive between the stripper blade 84 and its operating motor. The motor 88 is driven continuously and thereby imparts a continuous reciprocating movement to the arms 85 and blade 84. The blade operates to either withdraw or sever any fibers which have become entangled in the conveyor, thereby freeing the advancing mat as a whole from entanglement with the conveyor so that the mat, or the bats severed therefrom, can readily be removed. The stripper 84 also prevents clogging of the conveyor, thus preventing interference with the free passage of steam or air therethrough during the formation of the mat.

Modifications may be resorted to within the spirit and scope of our invention.

We claim:

1. The combination of an openwork support for fibers deposited thereon in matter form, and means to clear said support of entangled fibers, said clearing means comprising a blade interposed between the said support and the mat, and means for causing a shearing movement of the blade in juxtaposition to and in a plane parallel to said support and thereby freeing the mat from entanglement with said support.

2. The combination of an openwork support for fibers deposited thereon in matted form, and means to clear said support of entangled fibers, said clearing means comprising a thin, flat blade overlying the support and interposed between the mat and support, and means for reciprocating the blade in its own plane and parallel with the support while in contact with the surface of said support and thereby freeing the overlying mat from said surface.

3. The combination of a traveling screen conveyor, for supporting and conveying fibers forcibly projected against the screen and accumulated thereon in the form of a mat, and mechanism for freeing the mat from entanglement with the conveyor, said mechanism comprising a thin, flat blade overlying the conveyor and means for reciprocating it over the surface of the conveyor.

4. The combination of a traveling screen conveyor for supporting and advancing a mat deposited thereon, and mechanism for freeing the mat from entanglement with the conveyor, said mechanism comprising a thin, flat blade overlying the conveyor at an intermediate point in the direction of its travel, means for reciprocating said blade substantially in a plane parallel with the surface of the conveyor and close thereto and thereby freeing the mat, and means for removing the mat from the conveyor after it has passed beyond and cleared said blade.

DALE KLEIST.
GAMES SLAYTER.